Patented Dec. 14, 1948

2,455,936

UNITED STATES PATENT OFFICE 2,455,936

GELLING OF POLYVINYL ALCOHOL COATINGS

Wesley G. Lowe, Rochester, N. Y., assignor to Eastman Kodak Company, Rochester, N. Y., a corporation of New Jersey No Drawing. Application January 22, 1944
Serial No. 519,339

9 Claims. (Cl. 117—34)

1

This invention relates to a method of gelling polyvinyl alcohol coatings by incorporating certain heavy metal nitrates in the coating composition and, after coating upon a surface, fuming the layer formed with a volatile base. This invention also relates to the forming of coatings of polyvinyl alcohol in which both a boron compound and the heavy metal nitrate are employed together in the coating composition and a coating is formed and fumed with a volatile base to set the same.

Polyvinyl alcohol has been suggested for coating compositions and has been of interest probably because of its water-solubility characteristics. It has been recognized that it is a distinct advantage in the making of polyvinyl alcohol products to be able to set the polyvinyl alcohol rapidly at the desired time. Various methods have been suggested for accomplishing the setting or semi-solidifying of the polyvinyl alcohol in aqueous solution after it has been formed or placed where it was to be used.

One of the methods previously suggested for gelling polyvinyl alcohol was the incorporation of gelling agents in the composition, which cause gelling upon chilling of the material. In order to use compositions of this nature, however, it has been necessary to apply the composition while in a warm condition and, after coating out upon a surface, lowering the temperature to cause setting. Various limitations, however, were met with in the use of these gelling agents, principally that the setting was not as rapid as obtained with gelatin compositions, therefore, there was more danger of distortion and flow than in cases where gelatin was employed for the purpose. Various other disadvantages were also present such as the lack of effectiveness of the gelling agent in the presence of gelatin or some other colloidal material mixed with the polyvinyl alcohol.

One object of my invention is to provide a method of setting or gelling polyvinyl alcohol coatings rapidly, the only operation necessary at the time of setting merely being the fuming of the coating with a gaseous basic material. Another object of my invention is to provide a coating method in which the coating composition is employed at ordinary temperature. A further object of my invention is to provide a coating

2 method using polyvinyl alcohol in which the setting or gelling of the coating is not affected by the presence of gelatin in the composition. Other objects of my invention will apear herein.

I have found that by incorporating the nitrate of zirconium, iron (ferric) or uranium in an aqueous polyvinyl alcohol solution a coating composition is formed which, when coated out and fumed with ammonia or a like volatile base, sets or gels so that it may be easily cured without distortion or flow taking place. I have found that, if desired boric acid may be incorporated in the composition so that, upon fuming, both the heavy metal nitrate and the boric acid will exert a setting effect. The use of boron compounds for this purpose is disclosed in application Serial No. 501,990, now Patent No. 2,376,371, of myself and Kearney P. Griffin and application Serial No. 502,044, now Patent No. 2,439,108, of Henry C. Staehle. I have found that gelatin may be present in the coating composition without affecting the setting properties of the coating when fumed with a volatile base in accordance with my invention. In addition I have found that with the zirconium and ferric nitrate the composition is compatible with a large quantity of gelatin either incorporated in the solution or applied over a gelatin layer. This property is of value when it is desirable to apply a subbing layer over a gelatin layer in photographic film.

The proportion of heavy metal nitrate which is necessary to impart setting characteristics to the polyvinyl alcohol solution is rather small. Proportions of 1% or even less of the heavy metal nitrate based on the weight of polyvinyl alcohol can be employed. I prefer, however, that proportions of the heavy metal nitrates within the range of 5 to 20%, based on the weight of the polyvinyl alcohol, be used and ordinarily the amount added will be within this range. If desired, however, larger quantities than those specified may be employed. However, this is ordinarily unnecessary and, especially in the case of the ferric compound, may impart undesirable coloration to the product.

Besides being of value for ordinary polyvinyl alcohol coating compositions, my invention is also of value in the coating out of photographic emulsions in which polyvinyl alcohol is employed as the carrier for the silver halide, such emulsions being described, for instance, in my U. S. Patents Nos. 2,311,058 and 2,311,059. In the coating of photographic emulsion layers, it is especially desirable that the layer be set prior to the curing operation to prevent distortion or unevenness. My method provides a rapid manner of causing setting without the necessity of raising or lowering the temperature.

Another feature of my invention which is of value is its use together with boric acid compounds to promote the setting or gelling of polyvinyl alcohol coatings. Both the boric acid and the heavy metal nitrate contribute valuable attributes to a setting operation so that a combination of these gelling agents in polyvinyl alcohol when fumed with ammonia is characterized by rapid setting to a firm mass, non-stickiness and no reversibility until a pH near 3 is reached. The desirability of the latter property arises from the fact that during drying the ammonia absorbed by the film during fuming evaporates and the pH of the film falls. By having reversibility at a low pH, there is no danger of the gel reversing and becoming fluid. By using a combination of boron compound and heavy metal nitrate, the coating applied may be dried in a vertical or near vertical position without any appreciable flowing of the polyvinyl alcohol gel which is formed.

Another advantage of my invention most marked with zirconium nitrate lies in the fact that water-insolubility is achieved by my process in the dried film although the property of swelling in water is little effected. Not only is the coating which has been gelled by means of zirconium nitrate and volatile base insoluble in cold water but it also exhibits resistance to solution by hot water.

Both zirconium nitrate and ferric nitrate make possible compatibility of the polyvinyl alcohol composition with gelatin in various proportions so that the advantages of both colloids obtain in the resulting composition. If the amount of gelatin added to the composition is greater than that of the polyvinyl alcohol, the composition, after coating out, may be set by chilling either with or without fuming with ammonia. This compatibility of gelatin with the polyvinyl alcohol composition induced by the heavy metal nitrate is not interfered with by the addition of boric acid or some other boron compound. If a boron compound is incorporated in a polyvinyl alcohol composition in accordance with my invention, it must either be boric acid or it must be incorporated under acid conditions as it is necessary that the pH of the composition be less than 7 and preferably less than 6. As the heavy metal nitrates referred to impart an acid pH, ordinarily the pH will be that desired without any further action being taken.

The setting effect in accordance with my invention is accomplished by fuming the coating obtained with a volatile nitrogen base. The most commonly known compounds characterized by this designation are ammonia, methylamine and ethylamine and any one of these compounds would be suitable in that connection. The fuming may be applied in any suitable manner such as by means of a fuming box or by leading the coated article into an atmosphere of the volatile base. The setting action is most effective when the coatings or layers are thin, preferably less than .005" in thickness. For instance, if a coating of .001" is applied to a surface, the setting of the coating takes place almost immediately upon fuming with ammonia or some other volatile base. With thicker coatings it is ordinarily desirable to allow a little more time to assure even distribution of the base into the coating layer.

My invention is of great value in the preparation of photographic plates, films or paper involving coating with a polyvinyl alcohol emulsion in their preparation. During this coating step in the process of manufacturing light-sensitive photographic products, it is necessary to get very rapid setting in order to avoid flow of the emulsion on the film or paper, the necessity being greater in the case of film because such coatings are often appreciably thicker than coatings on paper thus tending to cause flow in spite of the viscosity inherent in the emulsions. I have found that by incorporating a small proportion of zirconium nitrate, ferric nitrate or uranyl nitrate, or a mixture of these nitrates, in the polyvinyl alcohol photographic emulsion that setting rapidly occurs after fuming with ammonia so that unevenness is avoided.

My method of setting photographic emulsion layers makes possible the use of very low viscosity polyvinyl alcohols as the carrier for the silver halides. Also my invention makes possible more dilution of polyvinyl alcohol photographic emulsions than has heretofore been considered safe to obtain a uniform and substantially even coating. A very convenient way to prepare photographic products in accordance with my invention is to treat the polyvinyl alcohol emulsion with a gelling agent which gels the emulsion at a low temperature thereby enabling the operator to cut the emulsion into shreds and wash the same. Thereupon the shreds are washed with cold water to remove everything but the silver halide and the carrier therefor. The washed emulsion may then be worked up and employed by coating it out to form photographic film or photographic paper. For instance, a good photographic paper may be prepared by taking an ordinary baryta coated paper, particularly one which has been coated with a polyvinyl alcohol in baryta as described and claimed in Clark application Serial No. 348,013, Patent No. 2,358,056, granted Sept. 12, 1944, and applying a coating thereto of a polyvinyl alcohol emulsion containing therein one of the heavy metal nitrates listed. After the coating operation has been completed, the emulsion layer is at once subjected to the action of ammonia gas which sets the emulsion enabling it to be readily dried without any waviness or other irregularity therein. The following examples illustrate my invention:

*Example 1*

To 100 cc. of a 10% solution of polyvinyl alcohol in water was added 10 cc. of a 10% solution of zirconium nitrate. The viscosity was not raised by this addition and the pH of the mixture was 2.2. A coating of this solution .04" thick was made on a glass plate and the plate was placed in a chamber filled with ammonia gas. After one minute the plate was removed. A fairly rigid gel had formed. The plate was placed in vertical position and allowed to dry at room temperature. The gel did not melt on drying and a transparent hard film was formed. This coating was stripped from the glass and was found to be free from haze and color and did not dissolve in hot water although it swelled freely. The polyvinyl alcohol employed was prepared by hydrolyzing polyvinyl acetate having 15 second viscosity.

Example 2

Example 1 was repeated except that a 10% solution of ferric nitrate was employed instead of the zirconium nitrate solution. Similar results were obtained except that the film had a brown color due to the presence of the ferric ion and the resistance of the film to hot water was less than when the zirconium nitrate was used.

Example 3

Example 1 was repeated except that a 10% solution of uranyl nitrate was used instead of zirconium nitrate. In this case the coating which was obtained had a light yellow color due to the presence of the uranyl ion therein.

Example 4

100 cc. of a 10% solution of polyvinyl alcohol in water was mixed with 10 cc. of a 10% solution of a zirconium nitrate and 4 cc. of a 4% solution of borax, which had been titrated to a pH of 6 with acetic acid, thus forming boric acid. The resulting mixture was coated on glass as in Example 1 and fumed with ammonia gas. The gel which was formed was very rigid and on drying a coating was obtained which was free from color and haze and showed excellent resistance to hot water.

Example 5

90 cc. of a 5% solution of polyvinyl alcohol was mixed with 10 cc. of a 5% solution of deashed gelatin. The mixture was cloudy and a sample coated on a glass plate dried down to a hazy incompatible film. 10 cc. of a 10% aqueous solution of zirconium nitrate was added to the solution. The solution cleared up and a coating thereof on a glass plate dried to a clear compatible film. Upon subjecting such a coating before drying to the action of ammonia fumes it was found to set to a rigid gel which dried to a clear water-insoluble film. To the remainder of the solution (90 cc.) was added 4 cc. of a 4% solution of boric acid. On coating out this solution and fuming the coating with ammonia, a gel was obtained which dried down to give a clear compatible film.

Example 6

Example 5 was repeated with mixtures containing 20%, 30%, 40% and 50% gelatin, the remainder being polyvinyl alcohol. In each case a clear mixture formed on the addition of zirconium nitrate and coatings in each case set when fumed with ammonia and dried down to clear films. In each case where boric acid was added and the coating was fumed with ammonia, a rigid gel was obtained. In the absence of zirconium nitrate, however, the mixture of gelatin and polyvinyl alcohol gave an incompatible film even though boric acid was present. In the case where 50% of gelatin was present it was found that the mixture could be set either by fuming with ammonia or by chilling, whichever was most desirable.

My invention is applicable not only to solutions of polyvinyl alcohol of high or medium viscosity but also to polyvinyl alcohols of low viscosity. It is also applicable to very dilute solutions as well as more concentrated solutions of polyvinyl alcohol in water. It is desirable, however, that the water solution contain at least 5% of polyvinyl alcohol in order to obtain a rigid gel although this depends upon the conditions of operation and is governed to some extent by the viscosity of the polyvinyl alcohol which is employed.

I claim:

1. A method of preparing coatings of polyvinyl alcohol which comprises mixing with an aqueous solution of polyvinyl alcohol a small amount of a heavy metal nitrate selected from the group consisting of zirconium nitrate, ferric nitrate, and uranyl nitrate forming a coating of this solution in a thin layer upon a surface and fuming the coating while wet with a volatile nitrogen base from the group consisting of ammonia, methylamine, and ethylamine.

2. A method of preparing photographic products from polyvinyl alcohol photographic emulsions which comprises mixing a small proportion of a heavy metal nitrate selected from the group consisting of zirconium nitrate, ferric nitrate and uranyl nitrate with the emulsion, coating it out in the form of a thin layer upon a support therefor and fuming the coating while wet with a volatile nitrogen base from the group consisting of ammonia, methylamine, and ethylamine whereby the emulsion is set to a rigid gel.

3. A method of preparing coatings of polyvinyl alcohol which comprises mixing with an aqueous solution of polyvinyl alcohol small amounts of a boron compound and a heavy metal nitrate selected from the group consisting of zirconium nitrate, ferric nitrate and uranyl nitrate, forming a coating of this solution in a thin layer upon a surface and fuming the coating while wet with a volatile nitrogen base from the group consisting of ammonia, methylamine, and ethylamine.

4. A method of preparing coatings of polyvinyl alcohol which comprises mixing with an aqueous solution of polyvinyl alcohol, a small amount of zirconium nitrate, forming a coating of the solution in a thin layer upon a surface and fuming the coating while wet with a volatile nitrogen base from the group consisting of ammonia, methylamine, and ethylamine.

5. A method of preparing coatings of polyvinyl alcohol which comprises mixing with an aqueous solution of polyvinyl alcohol small amounts of a boron compound and zirconium nitrate, forming a coating of this solution in a thin layer upon a surface and fuming the coating while wet with a volatile nitrogen base from the group consisting of ammonia, methylamine, and ethylamine.

6. A method of preparing coatings of polyvinyl alcohol which comprises mixing with an aqueous solution of polyvinyl alcohol, a small amount of ferric nitrate, forming a coating of the solution in a thin layer upon a surface and fuming the coating while wet with a volatile nitrogen base from the group consisting of ammonia, methylamine, and ethylamine.

7. A method of preparing coatings of polyvinyl alcohol which comprises mixing with an aqueous solution of polyvinyl alcohol a small amount of a heavy metal nitrate selected from the group consisting of zirconium nitrate, ferric nitrate and uranyl nitrate, forming a coating while wet of this solution in a thin layer upon a surface and fuming the coating with ammonia.

8. A method of preparing coatings which comprises mixing in aqueous solution polyvinyl alcohol, not more than an equal quantity of gelatin and a small amount of zirconium nitrate, forming a coating of the solution in a thin layer upon a surface and fuming the coating while wet with a volatile nitrogen base from the group consisting of ammonia, methylamine, and ethylamine.

9. A method of preparing photographic products from polyvinyl alcohol photographic emulsions, which comprises mixing a small proportion of zirconium nitrate with the emulsion, forming a coating of the emulsion in a thin layer upon a support therefor, and fuming the coating while wet with ammonia, whereby the emulsion is set to a rigid gel.

WESLEY G. LOWE.

REFERENCES CITED

The following references are of record in the file of this patent:

UNITED STATES PATENTS

| Number | Name | Date |
| --- | --- | --- |
| 2,138,751 | Vohrer | Nov. 29, 1938 |
| 2,162,618 | Izard | June 13, 1939 |
| 2,218,255 | Weyerts et al. | Oct. 15, 1940 |
| 2,251,296 | Shipp | Aug. 5, 1941 |
| 2,310,223 | Eaton et al. | Feb. 9, 1943 |
| 2,376,371 | Lowe et al. | May 22, 1945 |

OTHER REFERENCES

Elod et al., vol. 2, Chem. Abstracts, page 7763 (1938).